US011922204B1

(12) United States Patent
Balles et al.

(10) Patent No.: US 11,922,204 B1
(45) Date of Patent: Mar. 5, 2024

(54) DYNAMIC ASSET INVENTORY

(71) Applicant: CrowdStrike, Inc., Sunnyvale, CA (US)

(72) Inventors: Christopher Balles, San Diego, CA (US); Benjamin Pirkl, Bellevue, WA (US); Michael Cosmadelis, Mount Laurel, NJ (US); Kiley Butterworth, Cumming, GA (US); Stephen Richards, Lakewod, CO (US)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/243,562

(22) Filed: Sep. 7, 2023

(51) Int. Cl.
*G06F 16/00* (2019.01)
*G06F 9/455* (2018.01)
*G06F 16/22* (2019.01)

(52) U.S. Cl.
CPC ...... *G06F 9/45558* (2013.01); *G06F 16/2228* (2019.01); *G06F 2009/45587* (2013.01); *G06F 2009/45595* (2013.01)

(58) Field of Classification Search
USPC .......................................... 707/706
See application file for complete search history.

(56) References Cited

U.S. PATENT DOCUMENTS

| 11,275,944 | B1* | 3/2022 | Bhushan | G06T 19/006 |
| | | | | 707/707 |
| 11,709,649 | B2* | 7/2023 | Piercy | G06F 3/167 |
| | | | | 700/94 |
| 2020/0387967 | A1* | 12/2020 | Cella | G06V 10/762 |
| | | | | 707/707 |

\* cited by examiner

*Primary Examiner* — Alexandria Y Bromell
(74) *Attorney, Agent, or Firm* — Lee & Hayes, P.C.

(57) ABSTRACT

Methods and systems for generating and using a dynamic asset inventory are disclosed. According to an implementation, a dynamic inventory can be generated by a function included in a security agent that provides security for a network environment. First computing asset information can be collected from first data sources, and the first computing asset information can be supplemented with second computing asset information. The supplemented computing asset information can be used to generate log files for computing assets. The log files can be used to generate an asset search index that supports rapid search of the dynamic asset inventory.

20 Claims, 5 Drawing Sheets

DYNAMIC ASSET INVENTORY

BACKGROUND

Today's network environments include large numbers of computing assets. The assets are of diverse different types including, for example, different types of hardware and software assets. Furthermore, information describing the functions and properties of the assets may be stored in various different places in a computing environment, and such information may not be correlated in any meaningful way. As a result, attempts to correlate asset data based on common keys can take large amounts of processing power, may take correspondingly long amounts of time, or may simply fail due to data correlation demands on the back end.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
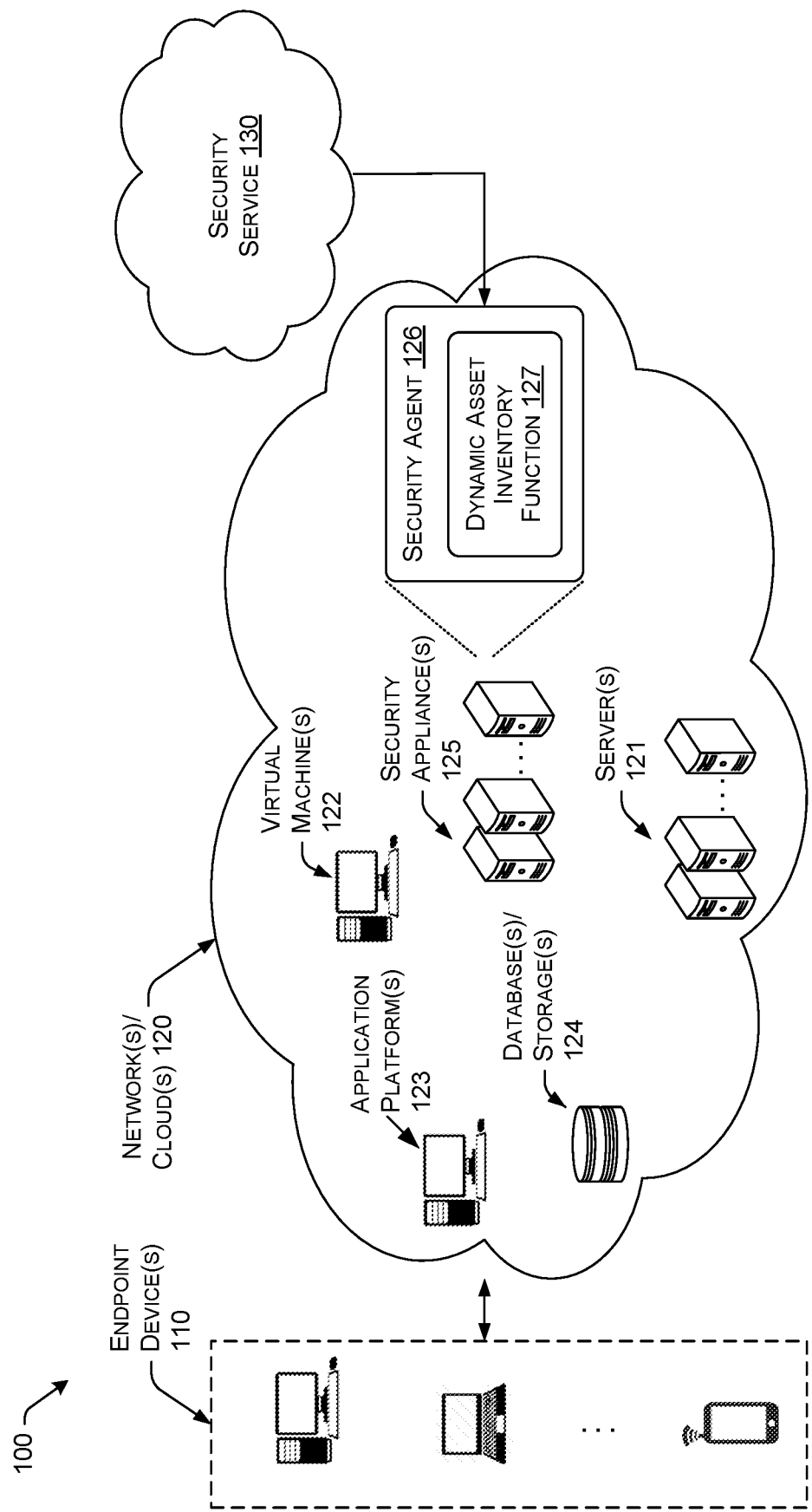
FIG. 1 illustrates an example network environment comprising a security agent equipped with a dynamic asset inventory function, in accordance with an embodiment of the present disclosure.

Techniques for generating and using a dynamic asset inventory comprising an inventory of computing assets in a network environment are disclosed herein. In an example, a dynamic asset inventory can be generated by a function, referred to herein as a "dynamic asset inventory function," which can optionally be included with a security agent that can be deployed into a network environment via a security service. The security agent and/or related systems can collect and store various information (referred to herein as "attributes") pertaining to computing assets within the network environment, and such data can be used, optionally along with other attributes stored elsewhere within the network environment, in connection with the techniques described herein.

In an example, a method for generating a dynamic asset inventory can comprise collecting, e.g., by a dynamic asset inventory function, first asset information that identifies computing assets in a computing environment. The first asset information can be collected from one or more first data sources. The first data sources can comprise, e.g., data sources native to the network environment which are not necessarily managed or associated with a security agent. In addition to computing asset identifiers, the first asset information can further comprise any number of further attributes associated with the computing assets. The first asset information can be grouped and normalized, followed by collecting second asset information.

The second asset information can be collected from one or more second data sources which can be different from the first data sources. In some embodiments, the second data sources can comprise, e.g., data sources which are created by, managed, used by or associated with a security agent. The second asset information can comprise, or can be used to determine, any number of additional attributes pertaining to the computing assets identified within the first asset information. Example methods can include supplementing the first asset information with the attributes included in or determined based on the second asset information that was collected from the second data sources.

After supplementing the first asset information with the second asset information, example methods can generate log files for computing assets. In some embodiments, a log file can be generated for each computing asset identified in the supplemented computing asset information. Each log file can comprise an asset identifier as well as attributes associated with the asset identifier in the supplemented asset information. The attributes in a log file can therefore optionally include attributes identified from the first data sources, attributes identified from the second data sources, or both.

The generated log files can be used to generate an asset search index. In some embodiments, the asset search index can be generated by a search index generator included in the security agent or dynamic asset inventory function. In other embodiments, generating the asset search index can comprise exporting the log files to a search index generation service which can generate the asset search index and optionally also subsequently process queries against the asset search index.

In some embodiments, the process of collecting computing asset information and generating the asset search index can be performed continuously within a network environment. In other embodiments, the process can be repeated at regular intervals, e.g., daily, weekly or monthly. In still further embodiments, the process can be repeated upon occurrence of one or more trigger events. An example trigger event can comprise a detected change in network topology, an addition of a new asset to a network environment, or an addition of a threshold number of new assets to a network environment.

An asset search index implementing a dynamic asset inventory can be used by running search queries against the asset search index. For example, the dynamic asset inventory function or the search index generation service can provide an asset search interface for use by a user of the network environment. The asset search interface can be configured to receive asset search queries comprising, e.g., free-form text strings that identify attributes, or attributes selected via search interface selection tools. An asset search query can identify one or more attributes of interest. The identified attribute(s) can be used to perform a search of the asset search index, resulting in identification of one or more matching computing assets that are associated with the identified attribute(s). Search results comprising asset identifiers of the one or more matching computing assets can be provided back to the user, e.g., via a portion of the asset search interface.

In some embodiments, a security agent that comprises the dynamic asset inventory function disclosed herein can comprise, e.g., a modified FALCON® agent made by CROWD- STRIKE®. Computing assets inventoried by the dynamic asset inventory function can comprise, e.g., host-based assets such as: Amazon Web Services (AWS®) Elastic Compute Cloud (EC2®) type assets, OBSERVIUM® type assets, PING REPLY® type assets, DEVICE42® type assets, VMWARE® type assets, and blade, blade manager, or blade server type assets. Any hardware or software computing assets can be identified and included in a dynamic asset inventory according to embodiments of this disclosure, including but not limited to containers, packages, and software applications, and this disclosure is not limited to any particular computing assets or asset types.

Example first data sources used by the dynamic asset inventory function in connection with embodiments of this disclosure can include, e.g., data sources associated with the computing asset types to be inventoried. For example, an AWS EC2® data source can be used to identify AWS EC2® assets, an OBSERVIUM® data source can be used to identify OBSERVIUM® assets, and so forth. In some embodiments, one or more individual computing assets can be associated with data from multiple of the first data sources, and the multiple first data sources can be used to collect multiple attributes to be associated with each individual computing asset.

In some embodiments, the dynamic asset inventory function can include a script or other automated computing function which can be initiated to perform the collection of first asset information. The script can furthermore optionally supplement the first asset information with second asset information. Such a script can be updated as needed to identify additional computing asset types, first data sources, second data sources, and attributes for collection. In some embodiments, a number of additional scripts, or additional functional modules, can be used to supplement first asset information with second asset information. For example, a different script or module can optionally be used to collect attributes from each separate second data source.

Example second data sources used by the dynamic asset inventory function in connection with embodiments of this disclosure can include, e.g., an elastic load balancer (ELB) type data source, a FALCON® agent type data source, a NESSUS® agent type data source, a NESSUS® vulnerability type data source, a SALT® type data source, a CHEF® type data source, a KUBERNETES® node type data source, as well as ownership data that identifies owners or managers responsible for a computing assets. An example ELB type data source can comprise, for instance, public facing attributes that indicate whether computing assets are public facing. An example FALCON® agent type data source can comprise, for instance, an agent identifier, a customer identifier, and other agent attributes. An example NESSUS® agent or vulnerability type data source can comprise, for instance, vulnerability attributes that indicate vulnerabilities associated with computing assets. An example SALT® type data source can comprise, for instance, task attributes that indicate tasks associated with computing assets. An example CHEF® type data source can comprise, for instance, a role name, a group name, or other automation setup attributes associated with computing assets. An example KUBERNETES® node type data source can comprise, for instance, container attributes associated with computing assets. An example ownership data type data source can comprise, for instance, ownership attributes associated with computing assets. Any of the above attributes can optionally be collected from the above described second data sources and used to supplement first computing asset information collected from first data source(s) described herein. This disclosure is not limited to any particular second data sources, and the above listed second data sources provide some examples.

In some embodiments, the first computing asset information as supplemented with the second computing asset information can be stored in a supplemented asset information store. The supplemented asset information store can be used to generate a log file for each identified computing asset. In some embodiments, the log files can comprise, e.g., javascript object notation (JSON) files. However, this disclosure is not limited to any particular log file type. Example search index generation services that can be used to generate a search index based on log files include, e.g., SPLUNK®, LOGSCALE® and HUMIO®. Any search index generation service can be used and this disclosure is not limited to any particular search index generation service.

Example implementations are provided below with reference to the following figures.

FIG. 1 illustrates an example network environment 100 comprising a security agent 126 equipped with a dynamic asset inventory function 127, in accordance with an embodiment of the present disclosure. FIG. 1 comprises endpoint device(s), network(s)/cloud(s) 120, and a security service 130. The network(s)/cloud(s) 120 includes server(s) 121, virtual machine(s) 122, application platform(s) 123, database(s)/storage(s) 124, and security appliance 125. The security appliance 125 can optionally comprise the security agent 126, and the security agent 126 can comprise a dynamic asset inventory function 127. The security agent 126 and the dynamic asset inventory function 127 can optionally be supplied to the network(s)/cloud(s) 120 by the security service 130.

In an embodiment, the one or more endpoint device(s) 110 can access, through a network, a variety of resources located in the network(s)/cloud(s) 120. The one or more security appliance(s) 125 can optionally be configured to provide security functions for devices in the network(s)/cloud(s) 120 as well as for endpoint device(s) 110, such as an intrusion detection or prevention system (IDS/IPS), denial-of-service (DoS) attack protection, session monitoring, and other security services. The security agent 126 can comprise a variety of functions that facilitate security of network(s)/cloud(s) 120. In an example, the security agent 126 can be implemented as a FALCON® type agent made by the CROWDSTRIKE® Corporation, and the network(s)/cloud(s) 120 can comprise a private network operated by a business, university, government agency or other entity.

In various examples, the endpoint device(s) 110 can comprise any devices that can connect to the networks/cloud(s) 120, either wirelessly or via direct cable connections. For example, the endpoint device(s) 110 may include but are not limited to personal digital assistants (PDAs), media players, tablet computers, gaming devices, smart watches, hotspots, personal computers (PCs) such as laptops, desktops, or workstations, or any other type of computing or communication device. In other examples, the endpoint device(s) 110 may comprise vehicle-based devices, wearable devices, wearable materials, virtual reality (VR) devices, smart watches, smart glasses, clothes made of smart fabric, etc.

In various examples, the network(s)/cloud(s) 120 can be a public cloud, a private cloud, or a hybrid cloud and may host a variety of resources such as one or more server(s) 121, one or more virtual machine(s) 122, one or more application platform(s) 123, one or more database(s)/storage(s) 124, etc. The server(s) 121 may include the pooled and centralized server resources related to application content, storage, and/or processing power. The application platform(s) 123 may include one or more cloud environments for designing, building, deploying and managing custom business applications. Virtual desktop(s) may image operating systems and applications of a physical device, e.g., any of endpoint device(s) 110, and allow users to access their desktops and applications from anywhere on any kind of endpoint devices. The database(s)/storage(s) 124 may include one or more of file storage, block storage or object storage.

It should be understood that the one or more server(s) 121, one or more virtual machine(s) 122, one or more application platform(s) 123, and one or more database(s)/storage(s) 124 illustrate multiple functions, available services, and available resources provided by the network(s)/cloud(s) 120. Although shown as individual network participants in FIG. 1, the server(s) 121, the virtual machine(s) 122, the application platform(s) 123, and the database(s)/storage(s) 124 can be integrated and deployed on one or more computing devices and/or servers in the network(s)/cloud(s) 120.

In implementations, the security appliance(s) 125 can comprise any types of firewalls. Example firewalls include a packet filtering firewall that operates inline at junction points of network devices such as routers and switches. A packet filtering firewall can compare each packet received to a set of established criteria, such as the allowed IP addresses, packet type, port number and other aspects of the packet protocol headers. Packets that are flagged as suspicious are dropped and not forwarded. Example firewalls may further include a circuit-level gateway that monitors transmission control protocol (TCP) handshakes and other network protocol session initiation messages across the network to determine whether the session being initiated is legitimate. Example firewalls may further include an application-level gateway (also referred to as a proxy firewall) that filters packets not only according to the service as specified by the destination port but also according to other characteristics, such as the hypertext transfer protocol (HTTP) request string. Yet another example firewall may be a stateful inspection firewall that monitors an entire session for a state of a connection, while also checking internet protocol (IP) addresses and payloads for more thorough security. A next-generation firewall, as another example firewall, can combine packet inspection with stateful inspection and can also include some variety of deep packet inspection (DPI), as well as other network security systems, such as IDS/IPS, malware filtering and antivirus functions.

In various examples, the security appliance(s) 125 can be deployed as one or more hardware-based appliances, software-based appliances, and/or cloud-based services. A hardware-based appliance may also be referred to as network-based appliance or network-based firewall. The hardware-based appliance can act as a secure gateway between the networks/cloud(s) 120 and the endpoint device(s) 110 and can protect the devices/storages inside the perimeter of the networks/cloud(s) 120 from being attacked by malicious actors.

Additionally or alternatively, the security appliance(s) 125 can be implemented on a cloud device. The security appliance(s) 125 can comprise or can cooperate with a cloud-based security service 130 provided through a managed security service provider (MSSP). A cloud-based service can be delivered to various network participants on demand and configured to track both internal network activity and third-party on-demand environments. In some examples, the security appliance(s) 125 can comprise software-based appliances implemented in part on any of the devices in the network(s)/cloud(s) 120 and/or on the endpoint device(s) 110. Software-based appliances may also be referred to as host-based appliances or host-based firewalls. Software-based appliances may include the security agent 126 or portions thereof, antivirus software, firewall software, etc., that can be installed on devices in the network(s)/cloud(s) 120 and/or on the endpoint device(s) 110.

In FIG. 1, the security appliance(s) 125 are shown as individual devices and/or individual cloud participants. However, it should be understood that the network environment 100 may include multiple security appliance(s) respectively implemented on the endpoint device(s) 110 and/or the network(s)/cloud(s) 120. As discussed herein, the security appliance(s) 125 can comprise a hardware-based firewall, a software-based firewall, a cloud-based firewall, or any combination thereof, in addition to the dynamic asset inventory function 127.

In some examples, in addition to the dynamic asset inventory function 127, the security appliance(s) 125 may include any number of other functions such as but not limited to an event monitor, an event log, a data pre-processing module, one or more anomaly detection module(s), an attack classification module, etc. An event monitor may monitor real-time user activities associated with one or more resources located in network(s)/cloud(s) 120. By way of example and without limitation, the real-time user activities may include attempting to log in to a secured website through the endpoint device(s) 110 and/or the application platform(s) 123, clicking a phishing link on a website or in an email from the endpoint device(s) 110 and/or the virtual machine(s) 122, attempting to access files stored in the database(s)/storage(s) 124, attempting to log in to the server(s) 121 as an administrator account, attempting to configure and/or re-configure the settings of various assets on the network(s)/cloud(s) 120, etc.

Information associated with monitored real-time user activities may be cached to the event log, e.g., as event log data. In general, the event log data can include a timestamp for each logged event, a user account associated with the event, an IP address of a computing device that generated the event, an HTTP address of a link being clicked by the user, a command line entered by the user, etc. The context behind the event log data may be used to interpret the potential purpose of the user behavior and to determine whether a user behavior is a malicious or not. The event log data may be further stored in an event database, located locally or remotely.

In implementations, event log data may be pre-processed before it is provided to anomaly detection module(s), as the quality of data also affects the usefulness of the information derived from the data. A data pre-processing module may perform one or more operations on the event log data such as data cleaning, data transformation, dimension reduction, etc. In some examples, the real-time event log data may be directly provided to the anomaly detection module(s) without pre-processing.

Anomaly detection module(s) may include one or more machine learning (ML) models, for example, a supervised ML model, a semi-supervised ML model, an unsupervised ML model, etc. Each of the ML models may be trained to produce a likelihood of an anomaly and the context associated with the anomaly. In some examples, the ML model may be trained to predict a plurality of potential anomalies with associated probability values. For instance, the ML model may predict that there is 40% chance of identity theft, 15% chance of privilege escalation, 8% chance of lateral movement, etc. The one or more ML models may be individually trained using labeled training data (i.e., data labeled based on ground truth knowledge), unlabeled training data (i.e., data without ground truth knowledge), or a combination thereof, etc. The training of the one or more ML models may be performed on computing devices and deployed on the security appliance(s) 125 once the performance of the one or more ML models satisfies a threshold.

In some examples, training data may be prepared based on event data stored in an event database. The event database may store raw event data with enriched information associated with each event. The data preparation may include operations such as data cleaning, instance selection, normalization, one hot encoding, transformation, feature extraction and selection, etc.

The various outputs of the one or more ML models of the anomaly detection module(s) may be provided to an attack classification module to make a final decision on the anomaly. When multiple ML models are used, the outputs from the anomaly detection module(s) may indicate potential anomalies across discrete domains, each with a prediction score. The attack classification module may use any type of classification algorithms/models to aggregate the outputs and determine a final prediction score based at least in part on the various prediction scores outputted from the anomaly detection module(s). The final prediction score may be further used to determine whether a user behavior includes an anomaly and what is the context behind the user behavior if it is a malicious attack. In some embodiments, based at least in part on the context, the attack classification module may determine it is a new type of attack.

While the dynamic asset inventory function 127 described further herein can optionally be included in a security agent 126, it should be emphasized that the dynamic asset inventory function 127 can alternatively be incorporated into other aspects of the network(s)/cloud(s) 120. For example, the dynamic asset inventory function 127 can optionally be implemented via the server(s) 121, the virtual machine(s) 122, and/or the application platform(s) 123. The dynamic asset inventory function 127 can generally operate to generate a dynamically updated and searchable inventory of assets included in the network(s)/cloud(s) 120. While such a function is useful in the context of the security agent 126, it is also useful in numerous other contexts as can be appreciated.

Figure 2:
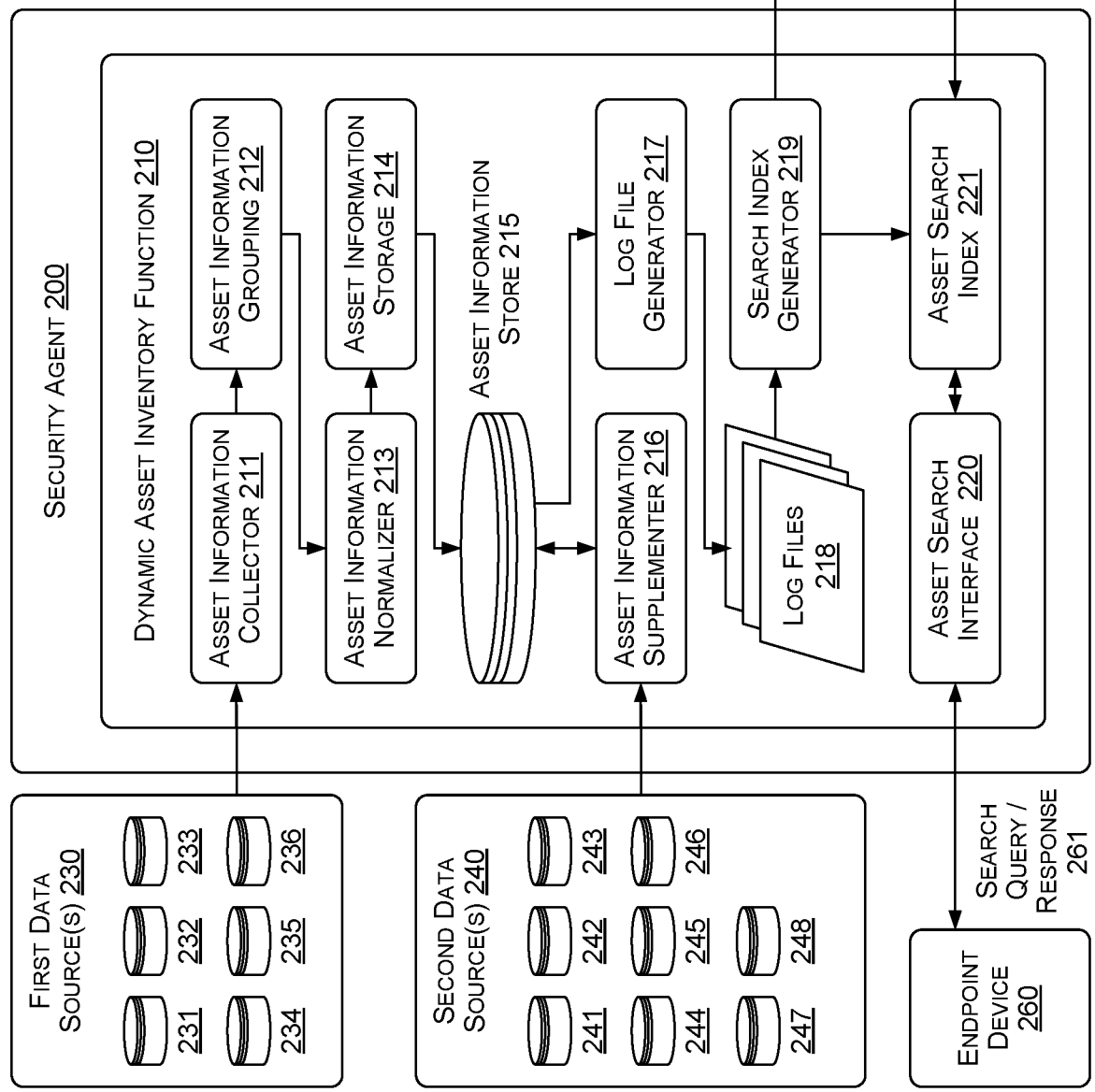
FIG. 2 illustrates an example security agent comprising a dynamic asset inventory function and example components and operations thereof, in accordance with an embodiment of the present disclosure.

FIG. 2 illustrates an example security agent 200 comprising a dynamic asset inventory function 210 and example components and operations thereof, in accordance with an embodiment of the present disclosure. The security agent 200 and dynamic asset inventory function 210 implement the security agent 126 and the dynamic asset inventory function 127 introduced in FIG. 1 in some embodiments. The security agent 200 can optionally comprise other functions other than the dynamic asset inventory function 210, as described in connection with FIG. 1.

The example dynamic asset inventory function 210 comprises asset information collector 211, asset information grouping 212, asset information normalizer 213, asset information storage 214, asset information store 215, asset information supplementer 216, log file generator 217, log files 218, search index generator 219, asset search interface 220, and asset search index 221.

FIG. 2 further illustrates example first data source(s) 230, second data source(s) 240, search index generation service 250, and endpoint device 260. The first data source(s) 230 include example data sources 231, 232, 233, 234, 235, and 236. More or fewer first data sources can be included in other embodiments. The second data source(s) 240 include example data sources 241, 242, 243, 244, 245, 246, 247, and 248. More or fewer second data sources can be included in other embodiments.

In an overview of example operations according to FIG. 2, the dynamic asset inventory function 210 can initially collect, from the first data source(s) 230, first asset information regarding computing assets included in a network environment such as the network environment 100 introduced in FIG. 1.

The dynamic asset inventory function 210 can next supplement the collected first asset information with second asset information collected from the second data source(s) 240. For example, the dynamic asset inventory function 210 can discover further attributes of computing assets identified via the first data source(s) 230, and the dynamic asset inventory function 210 can add the further attributes to the collected first asset information.

The dynamic asset inventory function 210 can then generate log files 218, wherein each log file is associated with an identified computing asset and includes the asset's attributes. The log files 218 can be used by the search index generator 219 to generate an asset search index 221. In some embodiments, the search index generator 219 can generate the asset search index 221 locally, while in other embodiments, the search index generator 219 can generate the asset search index 221 by exporting the log files 218 to a search index generation service 250, and the search index generation service 250 can in turn generate the asset search index 221.

The asset search interface 220 can be accessed from endpoint device 260 which can comprise, e.g., any of the endpoint device(s) 110 introduced in FIG. 1. The endpoint device 260 can submit a search query via the asset search interface 220. The asset search interface 220 can initiate a search responsive to the submitted search query. The search can comprise a search for query data in the asset search index 221. Any search results can be returned as a response via the asset search interface 220 to the endpoint device 260. The search query and the response are indicated in FIG. 2 as search query/response 261.

Turning now to FIG. 2 in further detail, the asset information collector 211 can comprise, e.g., a customizable script that is configured to collect, based on script configuration, the first asset information from the first data source(s) 230. The script can be customized to specify which of the first data source(s) 230 to use and which first asset information to collect therefrom. The asset information collector 211 can run repeatedly, e.g., on a periodic basis such as daily or weekly, or in response to trigger events such as the addition of a threshold number of new computing assets to a network environment 100.

In some examples, the first data source(s) 230 can include one or more of a blade asset data source 231, a VMware asset data source 232, a device 42 asset data source 233, a ping reply asset data source 234, an observium asset data source 235, and/or an amazon web services elastic cache asset type data source 236. Therefore, some embodiments may use up to six first data source(s) 230. Other embodiments may use at least six and optionally more first data source(s) 230.

Upon completion of asset information collection, the asset information collector 211 can optionally initiate one or more subsequent operations, e.g., operations of the asset information grouping 212, asset information normalizer 213, or asset information storage 214. The asset information grouping 212 can group collected asset information by asset type. The asset information normalizer 213 can normalize the collected asset information, e.g., by modifying collected information according to normalization rules and normalization sub-processing for different asset types. The asset information storage 214 can store the (optionally grouped and normalized) first asset information in the asset information store 215.

In some embodiments, the script that implements the asset information collector 211 can optionally initiate the asset information supplementer 216 after the first asset information is stored (as well as grouped and/or normalized) in the asset information store 215. The asset information supplementer 216 can collect or otherwise determine second asset information from the second data source(s) 240, and the asset information supplementer 216 can supplement the first asset information with the second asset information.

For example, in some embodiments, the asset information supplementer 216 can determine, from one of the second data source(s) 240, a first attribute of a first computing asset that is identified in the asset information store 215. The asset information supplementer 216 can be configured to supplement information associated with the first computing asset so that the associated information includes the first attribute. The asset information supplementer 216 can likewise identify additional attributes of the first computing asset, or of other assets, and can likewise supplement the stored information to include the additional attributes.

In some embodiments, the second data source(s) 240 can comprise data sources associated with operations of the security agent 200. Example second data source(s) 240 can include, e.g., an elastic load balancer (ELB) data source 241 which can comprise, e.g., attributes that indicate whether a computing asset is (or is not) public facing.

The example second data source(s) 240 can further include, e.g., a security agent data source 242 associated with the security agent 200. A security agent data source 242 can comprise, e.g., attributes such as agent ID of the security agent 200 and/or customer ID of the customer to whom the security agent 200 is deployed. The security agent data source 242 can comprise, e.g., a FALCON® agent data source in some embodiments.

The example second data source(s) 240 can further include, e.g., a vulnerability scanner type data source 243, or threat intelligence data source 244 associated with the security agent 200. A vulnerability scanner data source 243 or threat intelligence data source 244 can comprise, e.g., attributes such as identified security vulnerabilities associated with different computing assets. The vulnerability scanner type data source 243, or threat intelligence data source 244 can comprise, e.g., a NESSUS® data source in some embodiments.

The example second data source(s) 240 can further include, e.g., a task executor type data source 245 associated with the security agent 200. A task executor data source can comprise, e.g., attributes such as automated tasks that are associated with different computing assets. The task executor data source 245 can comprise, e.g., a SALT® data source in some embodiments.

The example second data source(s) 240 can further include, e.g., a network environment preparation type data source 246 associated with the security agent 200. A network environment preparation data source can comprise, e.g., attributes such as asset role names and asset owner names that are assigned by a network environment preparation application to prepare a network environment 100 for a security agent 200. The network environment preparation data source 246 can comprise, e.g., a CHEF® data source in some embodiments.

The example second data source(s) 240 can further include, e.g., a container type data source 247 associated with the security agent 200. A container data source can comprise, e.g., attributes such as container nodes that are associated with different computing assets. The container data source 247 can comprise, e.g., a KUBERNETES® data source in some embodiments.

The example second data source(s) 240 can further include, e.g., an ownership data source 248 associated with the security agent 200. A ownership data source can comprise, e.g., attributes such as manager names of managers that are responsible for different computing assets.

The asset information supplementer 216 can initiate the log file generator 217 after completing asset information supplement from the second data source(s) 240. The supplemented asset information can optionally be stored in the asset information store 215, or else in a separate data store. The log file generator 217 can use the enriched/supplemented asset information to generate the log files 218. In some embodiments, the log file generator 217 can be configured to generate a log file for each computing asset. The log file can comprise an asset identifier for the asset, as well as any attributes associated with the asset, which can include attributes collected by the asset information collector 211 as well as attributes collected by the asset information supplementer 216.

Upon completion of the log file generation, the search index generator 219 can use the log files 218 to generate an asset search index 221. The search index generator 219 can optionally export the log files 218 to a search index generation service 250 such as SPLUNK®, HUMIO®, or LOGSCALE®, and the search index generator 219 can instruct the search index generation service 250 to generate the asset search index 221.

The components and operations involved in generation of the asset search index 221, including elements 211-219 and 250 in FIG. 2, can be used repeatedly as needed to update the asset search index 221. The asset search index 221 can optionally be generated dynamically, e.g., responsive to addition of new computing assets in a network environment 100. Meanwhile, the asset search interface 220 can be adapted to use a latest updated version of the asset search index 221. While FIG. 2 shows the asset search index 221 hosted within the dynamic asset inventory function 210, in some embodiments, the asset search index 221 can be hosted within the search index generation service 250.

The asset search interface 220 can be configured to receive asset search queries, initiate asset searches according to the received asset search queries and return query responses comprising results of the asset searches. FIG. 2 illustrates an example endpoint device 260 that submits a search query and receives a response, indicated as search query and response 261. The asset search interface 220 can initiate searches of the asset search index 221 according to received queries and can return corresponding search results to the endpoint device 260.

Figure 3:
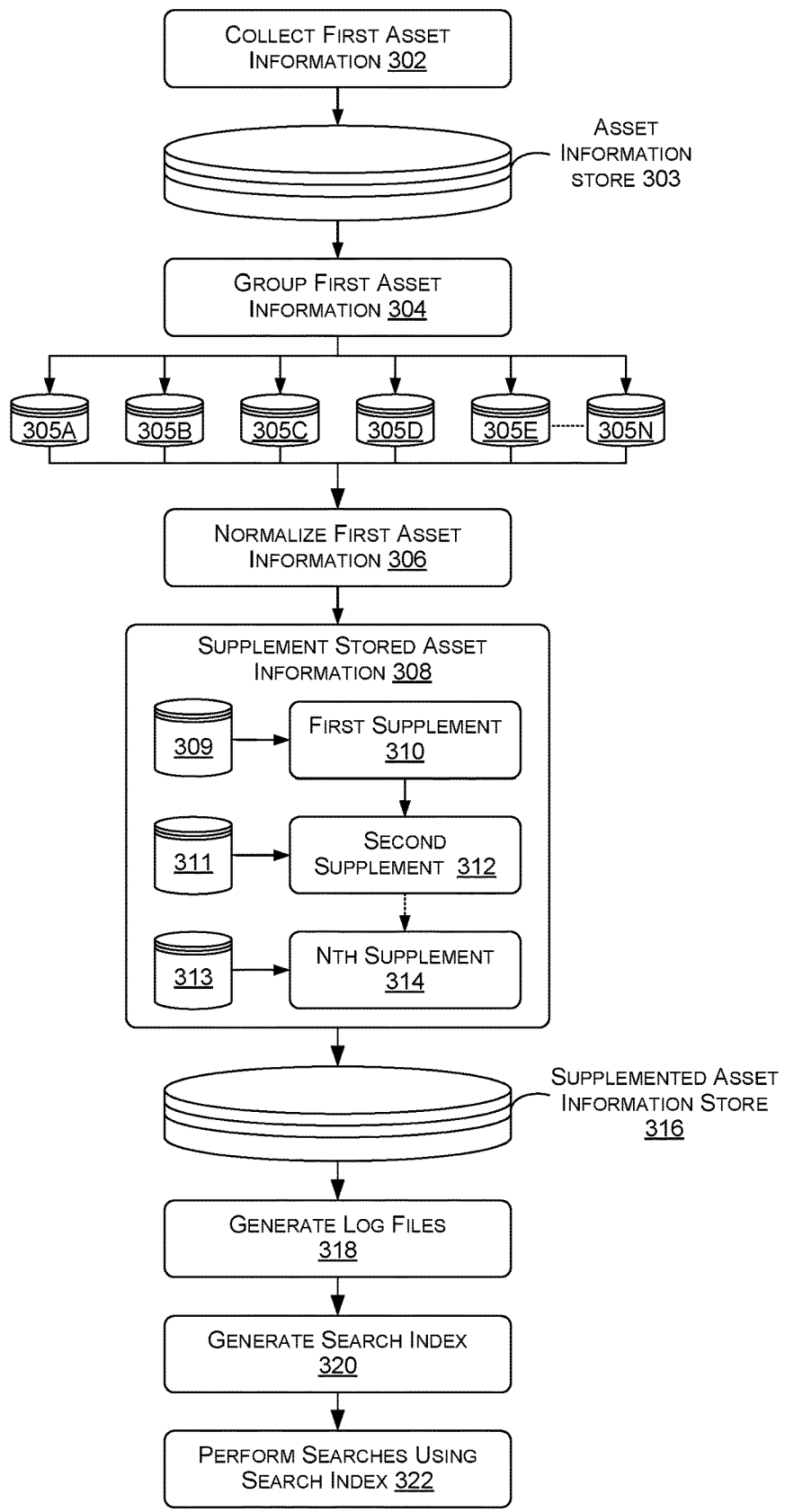
FIG. 3 illustrates example operations and data that can be used in connection with generating and using a dynamic asset inventory, in accordance with an embodiment of the present disclosure.

FIG. 3 illustrates example operations and data that can be used in connection with generating and using a dynamic asset inventory, in accordance with an embodiment of the present disclosure. The operations illustrated in FIG. 3 can be implemented by the dynamic asset inventory function 127 introduced in FIG. 1 in some embodiments.

FIG. 3 includes a "collect first asset information" operation 302, and a resulting asset information store 303. FIG. 3 further includes a "group first asset information" operation 304 and multiple resulting groups of stored asset information 305A, 305B, 305C, 305D, 305E . . . 305N. FIG. 3 further includes a "normalize first asset information" operation 306.

FIG. 3 further includes a "supplement stored asset information" operation 306. The operation 306 can comprise multiple different supplementing operations associated with different second data stores. For example, a first supplement operation 310 can supplement stored asset information with information from a data store 309, a second supplement operation 312 can supplement stored asset information with information from a data store 311, and so on up to an Nth supplement operation 314 that can supplement stored asset information with information from a data store 313. Supplemented data resulting from operation 306 can be stored in a supplemented asset information store 316.

FIG. 3 further includes a "generate log files" operation 318, a "generate search index" operation 320, and a "perform searches using search index" operation 322.

The operations illustrated in FIG. 3 can optionally be implemented by a dynamic asset inventory function 210 such as illustrated in FIG. 2. At the "collect first asset information" operation 302, first asset information can be collected, e.g., from first data source(s) 230. The first asset information can be stored in the asset information store 303. In some embodiments a collection system such as CONTOUR® can be used to collect data, and the asset information store 303 can comprise CONTOUR® which can be, e.g., in comma separated value (CSV) format.

At the "group first asset information" operation 304, the first asset information stored in the asset information store 303 can be grouped, e.g., by asset type. The different resulting groups can be stored separately, e.g., in data stores 305A-305N.

At the "normalize first asset information" operation 306, the asset information stored in each of the data stores 305A-305N can be normalized, e.g., by applying normalization rules and processing that may be specific to each different data store 305A-305N.

At the "supplement stored asset information" operation 306, stored asset information can be supplemented iteratively from each of multiple different second data source(s), 309, 311, 313, as noted above. Supplemented data resulting from each supplement operation 310, 312, 314 can be stored in a supplemented asset information store 316, so that the supplemented asset information store 316 ultimately comprises the normalized first asset information from each of the data stores 305A-305N as supplemented by the supplement operations 310, 312, 314. In some embodiments, a given supplement operation 310 may supplement data stored in a subset, i.e., less than all, of the data stores 305A-305N.

In response to completion of a "supplement stored asset information" operation 306, the "generate log files" operation 318, the "generate search index" operation 320, and the "perform searches using search index" operation 322 can generally operate as described in connection with FIG. 2, above.

Figure 4:
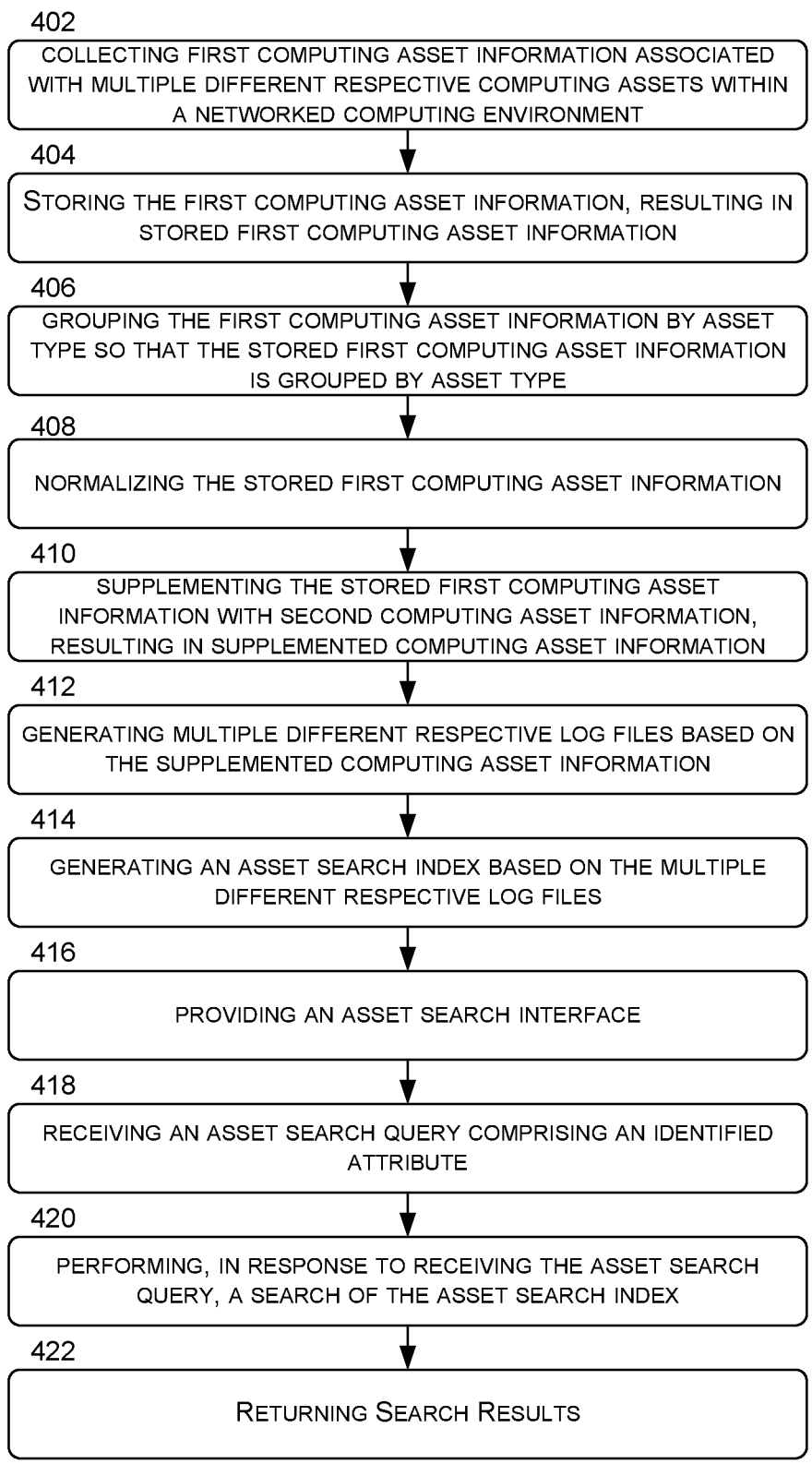
FIG. 4 illustrates an example process configured to generate and use a dynamic asset inventory, in accordance with an embodiment of the present disclosure.

FIG. 4 illustrates an example process configured to generate and use a dynamic asset inventory, in accordance with an embodiment of the present disclosure. By way of example and without limitation, the processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the processes. In some examples, multiple branches represent alternate implementations that may be used separately or in combination with other operations discussed herein.

The operations illustrated in FIG. 4 can be performed at least in part by a dynamic asset inventory function such as the dynamic asset inventory function 210 illustrated in FIG. 2. Operation 402 comprises collecting first computing asset information associated with multiple different respective computing assets within a networked computing environment. For example, the asset information collector 211 can collect the first computing asset information from the first data source(s) 230. In some embodiments, the asset information collector 211 can comprise a script that is configured to run automatically and repeatedly, wherein the script is configured to collect desired first computing asset information from the first data source(s) 230.

The multiple different respective computing assets can comprise, e.g., assets within a networked computing environment such as network(s)/cloud(s) 120. The multiple different respective computing assets can include assets of multiple different asset types, e.g., server assets associated with server(s) 121, virtual machine assets associated with virtual machine(s) 122, application assets associated application platform(s) 123, and/or database assets associated database(s)/storage(s) 124. In some embodiments, the multiple different respective computing assets can comprise one or more of a blade asset type, a VMware asset type, a device 42 asset type, a ping reply asset type, an observium asset type, and/or an amazon web services elastic cache asset type.

The first data source(s) 230 can comprise any data sources within a networked computing environment 100 such as network(s)/cloud(s) 120. In some embodiments, the first data source(s) 230 can comprise data sources associated with asset types, e.g., a blade asset type data source, a VMware asset type data source, a device 42 asset type data source, a ping reply asset type data source, an observium asset type data source, and/or an amazon web services elastic cache asset type data source. The first computing asset information collected from the first data source(s) 230 can comprise, for example, multiple different respective identifiers associated with the multiple different respective computing assets. The first computing asset information can therefore include asset identifiers of multiple assets, optionally along with some additional attributes associated with the multiple assets.

Operations 404, 406 and 408 can be performed in any order/sequence, or simultaneously, depending on the particular configuration. Operation 404 comprises storing the first computing asset information, resulting in stored first computing asset information. For example, the asset information storage 214 can store, in the asset information store 215, the first computing asset information collected via asset information collector 211 in an asset information store 215. The result can be stored first computing asset information that is stored in the asset information store 215.

Operation 406 comprises grouping the first computing asset information by asset type so that the stored first computing asset information is grouped by asset type. For example, the asset information grouping 212 can group the first computing asset information stored in the asset information store 215 by asset type. The asset types used for grouping can comprise any types, e.g., the various asset types described herein or other asset types, and any of the asset types can optionally be combined resulting in compound asset types in some embodiments.

Operation 408 comprises normalizing the stored first computing asset information. For example, the asset information normalizer 213 can normalize the first computing asset information stored in the asset information store 215. Normalizing can be operable to normalize asset identifiers, asset attributes, and/or asset data formats. Asset data collected from different first data source(s) 230 can be in different forms, and normalizing can modify collected data so that it satisfies normalization rules and formats.

Operation 410 comprises supplementing the stored first computing asset information with second computing asset information, resulting in supplemented computing asset information. In some embodiments, the asset information supplementer 216 can collect the second computing asset information from at least a second data source, e.g., from second data source(s) 240, which can be different from the first data source(s) 230 and within the same networked computing environment as the first data source(s) 230. For example, the second data source(s) 240 can comprise data sources, optionally of database(s)/storage(s) 124, which are associated with the operations of the security agent 126, e.g., by being created or managed by the security agent 126. In contrast, the first data source(s) 230 can comprise data sources, optionally of database(s)/storage(s) 124, which are associated with the operations of, e.g., the application platform(s) 123, the server(s) 121, the virtual machine(s) 122, or other components of the network(s)/cloud(s) 120.

In some embodiments, the asset information supplementer 216 can comprise a script that is configured to run automatically and repeatedly, wherein the script is configured to collect desired second computing asset information from the second data source(s) 240. The script can be a same script at the script implementing the asset information collector 211, or a different script which is optionally initiated by the asset information collector 211 or another module such as 212, 213, or 214.

The second computing asset information can comprise, e.g., multiple different attributes for association with respective computing assets of the multiple different respective computing assets identified via the first data source(s) 230.

Example attributes can include, e.g., "a public facing" attribute that indicates whether a computing asset is public facing. In some embodiments, "public facing" attribute information can be determined from elastic load balancer (ELB) information.

Example attributes can further include, e.g., a "vulnerability" attribute that indicates a vulnerability level associated with a computing asset. In some embodiments, "vulnerability" attribute information can be determined from Nessus type data or other threat information system data.

Example attributes can further include, e.g., a "Kubernetes" attribute that indicates a Kubernetes node. In some embodiments, "Kubernetes" attribute information can be determined from container data that is associated with containers that host at least a portion of a computing asset.

Example attributes can further include, e.g., an "ownership" attribute that indicates an owner associated with a computing asset, such as a name of a responsible person, manager, or team that is responsible for the computing asset. In some embodiments, "ownership" attribute information can be determined from an owner data repository.

Operation 412 comprises generating multiple log files based on the supplemented computing asset information. For example, the log file generator 217 can generate multiple different respective log files 218 from supplemented data stored in the asset information store 215. The multiple log files 218 can be associated with multiple different respective computing assets, so that, for example, one log file is generated per computing asset. Each respective log file can comprise, e.g., a respective identifier for its respective computing asset, and respective attribute(s) associated with its respective computing asset. The log files 218 can be generated in any desired format. For example, some embodiments may generate log files 218 in a comma separated value (CSV) format. Some embodiments may generate log files 218 in a javascript object notation (JSON) format.

Operation 414 comprises generating an asset search index based on the multiple log files. In some embodiments generating an asset search index can be performed locally by search index generator 219, and in other embodiments, the search index generator 219 can load/export the log files 218 to a search index generation service 250. Example search index generation services include, but are not limited to, products such as SPLUNK®, HUMIO®, and LOGSCALE®. The search index generation service 250 can return a generated asset search index 221 to the dynamic asset inventory function 210, or the search index generation service 250 can maintain the asset search index 221 at the search index generation service 250 and support/respond to subsequent queries forwarded from the dynamic asset inventory function 210.

Operation 416 comprises providing an asset search interface. For example, the dynamic asset inventory function 210 can provide the asset search interface 220, to any of the endpoint device(s) 110 operated by a user. The asset search interface 220 can generally be configured to perform/enable operations 418, 420, and 422.

Operation 418 comprises receiving an asset search query comprising an identified attribute. The identified attribute can include, e.g., any of the multiple different attributes associated with computing assets that are indexed in the asset search index 221. The identified attribute can be received, e.g., via a text entry box or "drop down" selection tool that supports query configurations.

Operation 420 comprises performing, in response to receiving the asset search query at 418, a search of the asset search index 221. The search can comprise a search for matching computing assets, e.g., matching assets of the multiple different respective computing assets indexed in the asset search index 221). The matching assets can comprise those computing assets that are associated with the identified attribute which was identified in the asset search query received at operation 418.

Operation 422 comprises returning search results. The search results can comprise, e.g., identifiers of the matching assets identified at operation 420. In some embodiments, the search results can be returned by sending the identifiers of the matching assets for display via the asset search interface 220, e.g., in a results panel of the asset search interface 220. In other embodiments, the search results can be returned by sending the identifiers of the matching assets in another file or data structure that is made available to the user or team that submitted the asset search query.

Figure 5:
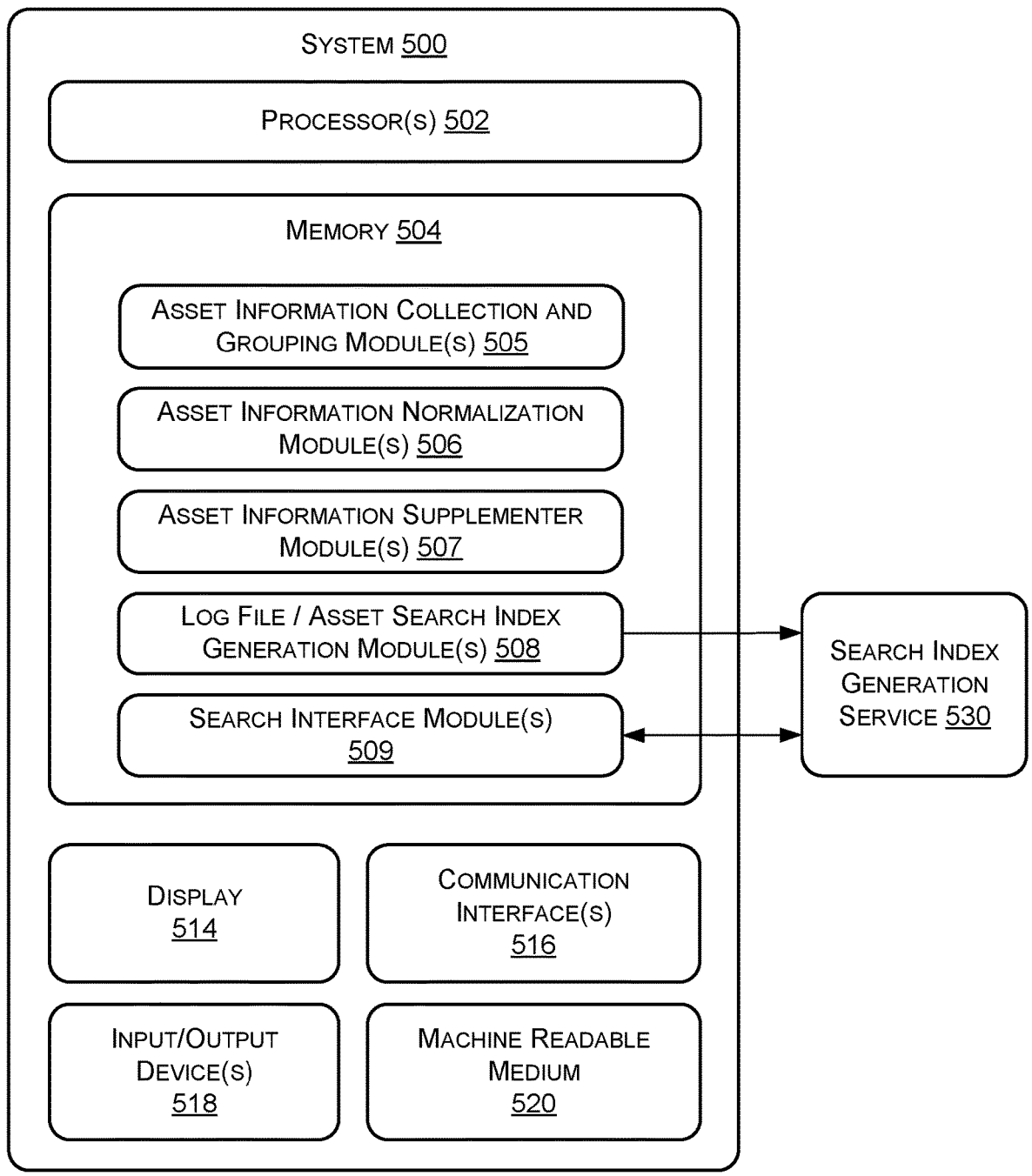
FIG. 5 illustrates an example system configured for dynamic asset inventory generation and use, in accordance with an embodiment of the present disclosure.

FIG. 5 illustrates an example system configured for dynamic asset inventory generation and use, in accordance with an embodiment of the present disclosure. The example system 500 can be implemented as one or more computing devices may correspond to the security appliance(s) 125, as illustrated in FIG. 1. The example system 500 may also comprise any computing device(s) on which the dynamic asset inventory function 127 can be implemented.

As illustrated in FIG. 5, a system 500 may comprise processor(s) 502, a display 514, communication interface(s) 516, input/output device(s) 518, and/or a machine readable medium 520. Furthermore, the system 500 can comprise a memory 504 storing asset information collection and grouping module(s) 505, asset information normalization module(s) 506, asset information supplementer module(s) 507, log file/asset search index generation module(s) 508, and search interface module(s) 509. The log file/asset search index generation module(s) 508 and the search interface module(s) 509 can optionally interact with a search index generation service 530 which can be optionally be implemented separately from the system 500.

In various examples, the processor(s) 502 can be a central processing unit (CPU), a graphics processing unit (GPU), or both CPU and GPU, or any other type of processing unit. Each of the one or more processor(s) 502 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 502 may also be responsible for executing all computer applications stored in memory 504, which can be associated with common types of volatile (RAM) and/or nonvolatile (ROM) memory.

In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the system 500. Any such non-transitory computer-readable media may be part of the system 500.

The asset information collection and grouping module(s) 505, asset information normalization module(s) 506, asset information supplementer module(s) 507, log file/asset search index generation module(s) 508, and search interface module(s) 509 can comprise modules that perform functions of the components illustrated in FIG. 2, FIG. 3, and FIG. 4. In some embodiments, the memory 504 can further comprise data sources such as the first data source(s) 230 and the second data source(s) 240 illustrated in FIG. 2, while in other embodiments, one or more of the first data source(s) 230 and the second data source(s) 240 can be implemented at other system(s).

Display 514 can be a liquid crystal display or any other type of display commonly used in the system 500. For example, display 514 may be a touch-sensitive display screen and can then also act as an input device or keypad, such as for providing a soft-key keyboard, navigation buttons, or any other type of input. Input/output device(s) 518 can include any sort of output devices known in the art, such as display 514, speakers, a vibrating mechanism, and/or a tactile feedback mechanism. Input/output device(s) 518 can also include ports for one or more peripheral devices, such as headphones, peripheral speakers, and/or a peripheral display. Input/output device(s) 518 can include any sort of input devices known in the art. For example, input/output device(s) 518 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The communication interface(s) 516 can include transceivers, modems, interfaces, antennas, and/or other components that perform or assist in exchanging radio frequency (RF) communications with base stations of the telecommunication network, a Wi-Fi access point, and/or otherwise implement connections with one or more networks.

The machine readable medium 520 can store one or more sets of instructions, such as software or firmware, that embodies any one or more of the methodologies or functions described herein. The instructions can also reside, completely or at least partially, within the memory 504, processor(s) 502, and/or communication interface(s) 516 during execution thereof by the system 500. The memory 504 and the processor(s) 502 also can constitute machine readable media 520.

The various techniques described herein may be implemented in the context of computer-executable instructions or software, such as program components, that are stored in computer-readable storage and executed by the processor(s) of one or more computing devices such as those illustrated in the figures. Generally, program components include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method, comprising:
    collecting first computing asset information associated with multiple computing assets within a networked computing environment,
    wherein the multiple computing assets include assets of multiple asset types,
    wherein the first computing asset information is collected from a first data source within the networked computing environment, and wherein the first computing asset information comprises multiple identifiers associated with the multiple computing assets;
    storing the first computing asset information, resulting in stored first computing asset information;
    supplementing the stored first computing asset information with second computing asset information, resulting in supplemented computing asset information, wherein the second computing asset information is from a second data source different from the first data source and within the networked computing environment, wherein the second computing asset information comprises multiple attributes for association with respective computing assets of the multiple computing assets;
    generating multiple log files based on the supplemented computing asset information, wherein the multiple log files are associated with the multiple computing assets, wherein each log file of the multiple log files comprises a respective identifier and a respective attribute associated with a respective computing asset; and
    generating an asset search index based on the multiple log files.

2. The method of claim 1, further comprising grouping the first computing asset information by asset type so that the stored first computing asset information is grouped by asset type.

3. The method of claim 2, further comprising normalizing the stored first computing asset information.

4. The method of claim 2, wherein the multiple asset types comprise one or more of a blade asset type, a VMware asset type, a device 42 asset type, a ping reply asset type, an observium asset type, and an amazon web services elastic cache asset type.

5. The method of claim 1, wherein at least one of the multiple attributes comprises a public facing attribute that indicates whether a computing asset is public facing.

6. The method of claim 1, wherein at least one of the multiple attributes comprises a vulnerability attribute that indicates a vulnerability associated with a computing asset.

7. The method of claim 1, wherein the multiple attributes comprise one or more of a Kubernetes attribute that indicates a Kubernetes node associated with a computing asset and an ownership attribute that indicates an owner associated with a computing asset.

8. The method of claim 1, wherein the multiple log files comprise javascript object notation (JSON) files.

9. The method of claim 1, further comprising providing an asset search interface, wherein the asset search interface is configured to:
    receive an asset search query comprising an identified attribute, wherein the identified attribute includes any of the multiple attributes;
    perform, in response to receiving the asset search query, a search of the asset search index for matching computing assets of the multiple computing assets, wherein the matching computing assets are associated with the identified attribute; and
    return search results comprising matching identifiers of the multiple identifiers, wherein the matching identifiers are associated with the matching computing assets.

10. A system, comprising:
    a processor, and
    at least one memory storing instructions executed by the processor to perform actions including:
    collecting first computing asset information associated with multiple computing assets within a networked computing environment,
    wherein the first computing asset information is collected from a first data source within the networked computing environment;
    supplementing the first computing asset information with second computing asset information, resulting in supplemented computing asset information, wherein the second computing asset information is from a second data source different from the first data source, wherein the second computing asset information comprises multiple attributes for association with respective computing assets of the multiple computing assets; and
    generating an asset search index comprising the first computing asset information and the second computing asset information, wherein the asset search index enables searches for assets of the multiple computing assets that are associated with searched attributes of the multiple attributes.

11. The system of claim 10, wherein the actions further comprise generating multiple log files based on the supplemented computing asset information, wherein the multiple log files are associated with the multiple different respective computing assets, and wherein the asset search index is generated based on the multiple log files.

12. The system of claim 11, wherein generating the asset search index based on the multiple log files comprises loading the multiple log files on an asset search index generation service.

13. The system of claim 10, wherein the actions further comprise providing an asset search interface configured to receive asset search queries of the asset search index.

14. The system of claim 10, wherein the actions further comprise normalizing the first computing asset information.

15. The system of claim 14, wherein at least one of the multiple attributes comprises a public facing attribute that indicates whether a computing asset is public facing.

16. The system of claim 15, wherein at least one of the multiple attributes comprises a vulnerability attribute that indicates a vulnerability associated with a computing asset or a Kubernetes attribute that indicates a Kubernetes node associated with a computing asset.

17. A computer-readable storage medium storing computer-readable instructions, that when executed by a processor, cause the processor to perform actions comprising:
collecting first computing asset information associated with multiple computing assets within a networked computing environment,
wherein the multiple computing assets include assets of multiple asset types,
wherein the first computing asset information is collected from a first data source within the networked computing environment, and wherein the first computing asset information comprises multiple identifiers associated with the multiple computing assets;
supplementing the first computing asset information with second computing asset information, resulting in supplemented computing asset information, wherein the second computing asset information is from a second data source different from the first data source and within the networked computing environment, wherein the second computing asset information comprises multiple attributes for association with respective computing assets of the multiple computing assets;
generating multiple log files based on the supplemented computing asset information; and
generating an asset search index based on the multiple log files.

18. The computer-readable storage medium of claim 17, wherein the actions further comprise grouping the first computing asset information by asset type so that the stored first computing asset information is grouped by asset type.

19. The computer-readable storage medium of claim 17, wherein the actions further comprise normalizing the stored first computing asset information.

20. The computer-readable storage medium of claim 17, wherein the multiple attributes comprise at least a public facing attribute that indicates whether a computing asset is public facing, and a vulnerability attribute that indicates a vulnerability associated with the computing asset.

* * * * *